(12) United States Patent
Sutton

(10) Patent No.: US 8,419,819 B2
(45) Date of Patent: Apr. 16, 2013

(54) SOLID UREA FERTILIZER

(75) Inventor: Allen R. Sutton, Corydon, KY (US)

(73) Assignee: Koch Agronomic Services, LLC, Wichita, KS (US)

( * ) Notice: Subject to any disclaimer, the term of this patent is extended or adjusted under 35 U.S.C. 154(b) by 135 days.

(21) Appl. No.: 11/821,322

(22) Filed: Jun. 22, 2007

(65) Prior Publication Data

US 2007/0295047 A1 Dec. 27, 2007

Related U.S. Application Data

(60) Provisional application No. 60/818,215, filed on Jun. 30, 2006, provisional application No. 60/816,060, filed on Jun. 23, 2006.

(51) Int. Cl.
*C05C 9/00* (2006.01)

(52) U.S. Cl.
USPC .......... 71/28; 71/30; 71/64.03; 71/64.05; 71/902

(58) Field of Classification Search .......... 71/28, 64.01–64.03; 47/57.5, 57.6, 58.1; 504/100, 101
See application file for complete search history.

(56) References Cited

U.S. PATENT DOCUMENTS 6,380,135 B1 * 4/2002 Reuter et al. .......... 504/366

FOREIGN PATENT DOCUMENTS

WO WO 03082005 A2 * 10/2003

* cited by examiner

*Primary Examiner* — Kaj K Olsen
*Assistant Examiner* — Pritesh Darji
(74) *Attorney, Agent, or Firm* — Kilpatrick Townsend & Stockton LLP

(57) ABSTRACT

A solid urea fertilizer prepared by mixing a solid, flowable, urea formaldehyde polymer with a urea source, such as molten or solid urea to form a fertilizer that has favorable crush strength characteristics, low biuret content, and/or desirable storage and handling properties. The urea fertilizer may contain additionally, an aqueous urea formaldehyde solution or mixture. Optionally, the fertilizer may contain a urease inhibitor and/or a nitrification inhibitor.

10 Claims, No Drawings

SOLID UREA FERTILIZER

RELATED APPLICATIONS

The present application claims the benefit of the provisional application No. 60/818215 filed Jun. 30, 2006 and provisional application 60/816060 filed Jun. 23, 2006, now abandoned.

FIELD OF THE INVENTION

The field of the invention is synthetic ureas. More specifically the field is of urea-containing fertilizers. This invention discloses a solid, flowable fertilizer containing a urea-formaldehyde polymer, combined with a urea source such as molten urea and/or solid urea and granulated to produce a solid fertilizer having desirable crush strength characteristics, low biuret content and/or improved storage and handling properties.

BACKGROUND OF THE INVENTION

Nitrogen is an important plant nutrient. In addition to phosphorous, potassium, and other nutrients, nitrogen is needed to support the growth and development of plant life. Some plants, such as legumes, through a symbiotic relationship with *Rhizobium* bacteria, take up elemental nitrogen from the atmosphere and fix this nitrogen into the soil. However, most plants grown to produce human and animal food are not legumes and require the use of nitrogen fertilizer in order to sustain their agricultural production.

The most widely used and agriculturally important high-analysis nitrogen fertilizer is urea, $CO(NH_2)_2$. Most of the urea currently produced is used as a fertilizer in its granular or prilled form. The proposed invention is a fertilizer prepared by combining a solid, flowable urea formaldehyde polymer (UFP) with a urea source such as molten and granulating or prilling, or combining with a solid urea. The UFP may be used to replace an aqueous urea formaldehyde (UF) solution, such as UF 85, and provides the desired crush strength, low biuret content and/or storage and handling properties. The desired crush strength is greater than or equal to about 2.5 pounds. Biuret is an undesirable by-product of synthetic urea production that may be phytotoxic at higher concentrations. The UFP absorbs ammonia, which may prevent the undesirable formation of biuret. It is desirable to have less than about 1.75% biuret in the fertilizer composition.

Optionally, the solid UFP may be used in combination with an aqueous UF solution or mixture. Other synthetic urea products than fertilizer are also contemplated in this invention, including adhesives, livestock feed and industrial emissions control.

Granulated solid urea is hygroscopic, and tends to clump when stored under humid conditions. Absorbent materials, such as attapulgite clay and diatomaceous earth are blended with granulated urea to prevent clumping and aid in the storage and handling of solid urea. Blending UFP with solid urea, prevents clumping of the urea and aids in the storage and handling of the product.

DETAILED DESCRIPTION OF THE INVENTION

All percentages are by weight, unless otherwise indicated. The UFP of the present invention may be a polymethyl urea resin with approximately 0.6% reactive methylol groups. It has primary particles of 0.1 to 0.15 micrometers, forming agglomerates of 3.5 to 6.5 micrometers diameter on average. The preferred UFP is marketed as PERGOPAK M® 2, a trademark of Albemarle Corporation, which contains from about 10 to 15% water. Alternatively, the UFP is the unrefined precursor to PERGOPAK M® 2, sometimes referred to as "the filter cake", and contains from about 40 to 80% water. Based on the dry weight of the UFP, the range in the fertilizer is from about 0.01 to about 12%, and more preferably in the range of about 0.01 to 1.2%. If the filter cake is used, greater amounts by weight must be used to achieve the desired results, because of the higher water content of the UFP filter cake. The UFP can be added to the urea prior to granulation of the urea. After granulation, the urea product demonstrates the desired crush strength and/or low biuret content.

Optionally, the UFP can be used in the solid urea fertilizer with an aqueous urea formaldehyde (UF) solution or mixture. An example of an aqueous UF solution is UF85, which is a commercially-available solution containing about 25% urea, about 60% formaldehyde, and about 15% water, available under the trademark STA-FORM 60®. The aqueous UF solution can be present in the solid urea fertilizer in the range of about 0.01 to 10.0%. Preferably, the aqueous UF solution or mixture is present in the range of about 0.1 to 1.0%. When both the UFP and the UF mixture or solution are used, the ratio of the two can range from about 2:1 to 1:100 UFP to UF mixture or solution.

The solid, flowable UFP can be treated with a urease inhibitor, such as NBPT, a nitrification inhibitor, such as DCD, herbicides, pesticides, micronutrients, etc., before or after combining with the urea source. Alternatively, additional components can be added after the UFP has been combined with the urea source, before granulating the product. Optionally, an aqueous UF solution or mixture may be added to the solid, flowable UFP before granulation.

The UFP can be blended with solid urea to provide a solid fertilizer that has improved storage and handling properties.

EXAMPLES

The following examples are for illustrative purposes only and are not intended to limit the invention in any manner. All percentages are by weight unless otherwise indicated.

Example 1

Six continuous trials were made preparing a solid fertilizer made of a blend of molten urea with UF85 and/or PERGOPAK M® 2 (shown in Table 1 as UFP). Each sample in this example contained at least some UF-85, because the seed material (starting material) contained some UF-85. The fertilizers made with urea blends were tested for biuret content and crush strength. The data is summarized in Table 1, below.

TABLE 1

Urea Blends Containing UFP

| Trial # | % UFP | % UF85 | % Biuret | Crush Strength (lb) |
|---|---|---|---|---|
| 1 | 0 | 0.50 | 1.48 | 5.1 |
| 2 | 0.06 | 0 | 1.51 | 6.22 |
| 3 | 0.12 | 0 | 1.47 | 5.87 |
| 4 | 0.12 | 0.50 | 1.20 | 6.8 |
| 5 | 0.06 | 0.50 | 1.18 | 7.47 |
| 6* | 0.06 | 0.50 | 1.21 | 8.58 |

*Contains NBPT and DCD.

The fertilizer samples made with UFP and without UF85 (trials 2 and 3) had increased crush strength over samples made with UF85 alone (trial 1). Samples made with a combination of UFP and UF 85 provided both an increase in crush strength and decrease in biuret (trials 4, 5 and 6) when compared to trial 1.

Example 2

Six continuous trials were made preparing a solid fertilizer of granulated molten urea alone (trial 1), and of blends of molten urea with PERGOPAK M® 2 (trials 2 and 3), PERGOPAK M® 2 filter cake (shown in Table 3 as UFP-FC) (trials 4 and 5), and UF-85 (trial 6). Trials 1 through 5 were completely free of UF-85. The fertilizers made with urea blends were tested for biuret content and crush strength. The data is summarized in Table 2, below.

TABLE 2

Urea Blends without UF- 85

| Trial # | % UFP | % UFP-FC | % UF-85 | % Biuret | Crush Strength (lb) |
|---|---|---|---|---|---|
| 1 | 0 | 0 | 0 | 1.3 | 2.88 |
| 2 | 0.06 | 0 | 0 | 1.7 | 3.15 |
| 3 | 0.12 | 0 | 0 | 1.1 | 3.32 |
| 4 | 0 | 0.25 | 0 | 1.3 | 4.10 |
| 5 | 0 | 0.50 | 0 | 1.0 | 2.93 |
| 6 | 0 | 0 | 0.5 | 1.3 | 4.76 |

The examples of the invention, trials 2 through 5 demonstrate the desired crush strength and % biuret content for the fertilizer composition.

Control sample 1, is granular urea alone, and control sample 6 is urea formaldehyde fertilizer with UF-85.

The invention claimed is:

1. A solid fertilizer comprising urea, a polymethyl urea resin and an aqueous solution of UF or a mixture of UF and water, wherein the content of the polymethyl urea resin in the fertilizer is in the range of about 0.01 to 12.0 weight % based on dry weight of the polymethyl urea resin, wherein the polymethyl urea resin is an agglomeration of primary particles with a diameter of from about 0.1 to 0.15 micrometers, wherein the agglomeration is from about 3.5 to 6.5 micrometers on average.

2. The fertilizer of claim 1, wherein the fertilizer contains a urease inhibitor or a nitrification inhibitor or a combination thereof.

3. The fertilizer of claim 1, wherein the polymethyl urea resin contains from about 10 to 15 weight % water.

4. The fertilizer of claim 1, wherein the polymethyl urea resin contains from about 40 to 80 weight % water.

5. The fertilizer of claim 1, wherein the aqueous solution or mixture of UF is present in the range of about 0.01 to 10.0 weight %.

6. A method of preparing a fertilizer composition comprising mixing a polymethyl urea resin with urea and an aqueous solution of UF, wherein the content of the polymethyl urea resin in the fertilizer is in the range of about 0.01 to 12.0 weight % based on the dry weight of the polymethyl urea resin, wherein the polymethyl urea resin is an agglomeration of primary particles with a diameter of from about 0.1 to 0.15 micrometers, wherein the agglomeration is from about 3.5 to 6.5 micrometers on average.

7. The method of claim 6, wherein the polymethyl urea resin is mixed with a urease inhibitor or a nitrification inhibitor or a combination thereof.

8. The method of claim 6, wherein the aqueous solution of UF is present from about 0.01 to 10.0 weight %.

9. The method of claim 6, wherein the urea is solid urea or molten urea.

10. The fertilizer of claim 1, wherein the urea is solid urea or molten urea.

* * * * *